(12) United States Patent
Chapman et al.

(10) Patent No.: US 11,904,409 B2
(45) Date of Patent: Feb. 20, 2024

(54) SYSTEM AND METHOD FOR DETERMINING ADDITIVE MANUFACTURING BEAM PARAMETERS

(71) Applicant: THE BOEING COMPANY, Chicago, IL (US)

(72) Inventors: Eric M. Chapman, Bonney Law, WA (US); Dana A. Henshaw, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 834 days.

(21) Appl. No.: 16/853,975

(22) Filed: Apr. 21, 2020

(65) Prior Publication Data

US 2021/0323090 A1 Oct. 21, 2021

(51) Int. Cl.
*B23K 26/342* (2014.01)
*B29C 64/153* (2017.01)
(Continued)

(52) U.S. Cl.
CPC ............ *B23K 26/342* (2015.10); *B22F 10/28* (2021.01); *B22F 10/36* (2021.01); *B22F 10/38* (2021.01); *B22F 10/80* (2021.01); *B23K 26/04* (2013.01); *B23K 26/06* (2013.01); *B23K 26/064* (2015.10); *B23K 26/08* (2013.01); *B29C 64/153* (2017.08);
(Continued)

(58) Field of Classification Search
CPC ...... B23K 26/342; B23K 26/04; B23K 26/06; B23K 26/064; B23K 26/08; B22F 10/28; B22F 10/36; B22F 10/38; B22F 10/80; B29C 64/153; B29C 64/393;
(Continued)

(56) References Cited

U.S. PATENT DOCUMENTS 8,884,186 B2 * 11/2014 Uckelmann ............. B22F 10/28
                                            219/121.85
10,105,897 B2 * 10/2018 Weitzel .................. B29C 64/40
(Continued)

OTHER PUBLICATIONS

Fiegl, Tobias et al; "Impact of build envelope on the properties of additive manufactured parts from AlSi 10Mg;" Sep. 22, 2018; Elsevier Ltd.; Optics and Laser Technology 111; 51-57 (Year: 2018).*

(Continued)

*Primary Examiner* — Tu B Hoang
*Assistant Examiner* — Erwin J Wunderlich
(74) *Attorney, Agent, or Firm* — The Small Patent Law Group LLC; Philip S. Hof

(57) ABSTRACT

Additive manufacturing system includes one or more processors configured to determine one or more geometrical characteristics of each of multiple segments of a build part at a candidate position of the build part relative to an additive manufacturing instrument. The geometrical characteristics include an angle of incidence between a beam line extending from a beam emitter and a surface normal of a respective skin of the corresponding segment proximate to the beam line. The one or more processors select, based on the determined geometrical characteristics, a first set of beam parameters for forming a first segment of the build part and a second set of beam parameters for forming a second segment of the build part. At least one of the beam parameters in the second set differs from the beam parameters in the first set.

21 Claims, 6 Drawing Sheets

(51) Int. Cl.
   *B29C 64/393* (2017.01)
   *B33Y 50/02* (2015.01)
   *B22F 10/36* (2021.01)
   *B22F 10/28* (2021.01)
   *B33Y 10/00* (2015.01)
   *B33Y 30/00* (2015.01)
   *B33Y 50/00* (2015.01)
   *B29C 64/268* (2017.01)
   *B23K 26/064* (2014.01)
   *B23K 26/04* (2014.01)
   *B23K 26/06* (2014.01)
   *B23K 26/08* (2014.01)
   *B22F 10/38* (2021.01)
   *B22F 10/80* (2021.01)

(52) U.S. Cl.
   CPC ............ *B29C 64/393* (2017.08); *B33Y 50/02* (2014.12); *B29C 64/268* (2017.08); *B33Y 10/00* (2014.12); *B33Y 30/00* (2014.12); *B33Y 50/00* (2014.12)

(58) Field of Classification Search
   CPC ....... B29C 64/268; B33Y 50/02; B33Y 10/00; B33Y 30/00; B33Y 50/00
   USPC .......................................................... 219/76
   See application file for complete search history.

(56) References Cited

U.S. PATENT DOCUMENTS

| | | | |
|---|---|---|---|
| 11,073,824 B1* | 7/2021 | Chapman | B33Y 50/00 |
| 2015/0210013 A1* | 7/2015 | Teulet | B29C 64/153 |
| | | | 425/150 |
| 2016/0306901 A1* | 10/2016 | Ainsworth | G06F 30/00 |
| 2017/0282246 A1* | 10/2017 | Liebl | B33Y 50/02 |
| 2019/0001415 A1* | 1/2019 | Morimoto | B29C 64/393 |
| 2019/0074853 A1* | 3/2019 | Kim | B33Y 50/00 |
| 2019/0358736 A1* | 11/2019 | Levine | B33Y 10/00 |
| 2020/0269352 A1* | 8/2020 | Maurer | B23K 26/073 |
| 2021/0387261 A1* | 12/2021 | Takeshita | B22F 10/34 |
| 2022/0207829 A1* | 6/2022 | Stahl | A61C 1/082 |

OTHER PUBLICATIONS

Extended European Search Report for related European Patent Application No. 21156309.3 dated Jul. 23, 2021 (13 pages).

Wang et al., "Research on the fabricating quality optimization of the overhanging surface in SLM process", Int J Adv Manuf Technol (2013) 65:1471-1484 (14 pages).

Kleszczynski et al. "Position Dependency of Surface Roughness in Parts from Laser Beam Melting Systems" 26th International Solid Free Form Fabrication (SFF) Symposium; 2015 (11 pages).

* cited by examiner

SYSTEM AND METHOD FOR DETERMINING ADDITIVE MANUFACTURING BEAM PARAMETERS

FIELD OF THE DISCLOSURE

Embodiments of the present disclosure generally relate to additive manufacturing of three-dimensional build parts.

BACKGROUND

Additive manufacturing refers to any process for manufacturing a three-dimensional build part in which successive layers of base material are deposited under computerized control. The deposited layers are selectively fused via the application of a focused energy source, such as a laser, which heats and bonds the material. The size and shape of the build part can be based on a three-dimensional computer model or another electronic data source. Additive manufacturing can be used to fabricate objects that have complex structures and shapes. Additive manufacturing techniques for fabricating metal build parts can allow greater design freedom and yield more precise and repeatable finished products than conventional metal manufacturing techniques, such as die-casting, extruding, and the like.

The set-up for an additive manufacturing build process includes selecting the design of the build part that is to be constructed and specifying the positioning of the build part on a build platform of the additive manufacturing instrument. The position can refer to the location of the build part relative to the build platform, such as relative to a center and/or to edges of the platform, as well as to an orientation of the planned build part relative to the platform, such as a rotational orientation about a vertical axis and/or an angular orientation (e.g., tilt or lean) of the build part. Typically, few factors, if any, are considered when determining the position of the build part relative to the platform. One known consideration involves arranging multiple build parts on the platform to increase a total number of build parts that can be printed during a common build process.

Generally, the build part position is determined without consideration of how the positioning will affect the surface and sub-surface quality of the resulting manufactured build part, such as the surface roughness, porosity, and other quality properties. After the additive manufacturing build process, the build part is typically inspected and rough surfaces of the build part are ground down to increase smoothness. Post-processing tasks such as grinding rough surfaces of the build parts can be costly, difficult, time intensive, and/or labor intensive. Grinding of rough surfaces and additional post-processing tasks to improve the surface quality of the build parts reduces manufacturing efficiency and increases production costs. Additionally, for parts having inaccessible regions where typical post-processing may be ineffective or impossible, current methods may be insufficient. Furthermore, if the surface quality, sub-surface quality, or dimensional accuracy of a build part is sufficiently degraded during the additive manufacturing process, the entire built part may need to be scrapped, which is a waste of time and resources.

SUMMARY OF THE DISCLOSURE

In one or more embodiments, an additive manufacturing system is provided that includes one or more processors. The one or more processors are configured to determine one or more geometrical characteristics of each of multiple segments of a build part at a candidate position of the build part relative to an additive manufacturing instrument. The one or more geometrical characteristics include an angle of incidence between a beam line extending from a beam emitter of the additive manufacturing instrument and a surface normal of a respective skin of the corresponding segment proximate to the beam line. The one or more processors are configured to select, based on the one or more geometrical characteristics of the segments that are determined, a first set of beam parameters for forming a first segment of the segments of the build part and a second set of beam parameters for forming a second segment of the segments of the build part. At least one of the beam parameters in the second set differs from the beam parameters in the first set.

In one or more embodiments, a method (e.g., for selecting additive manufacturing beam parameters) is provided. The method includes determining one or more geometrical characteristics of each of multiple segments of a build part at a candidate position of the build part relative to an additive manufacturing instrument. The one or more geometrical characteristics include an angle of incidence between a beam line extending from a beam emitter of the additive manufacturing instrument and a surface normal of a respective skin of the corresponding segment proximate to the beam line. The method also includes selecting, based on the one or more geometrical characteristics of the segments that are determined, a first set of beam parameters for forming a first segment of the segments of the build part and a second set of beam parameters for forming a second segment of the segments of the build part. At least one of the beam parameters in the second set differs from the beam parameters in the first set.

In one or more embodiments, an additive manufacturing system is provided that includes one or more processors. The one or more processors are configured to determine an angle of incidence of each of multiple segments of a build part at a candidate position of the build part. The angle of incidence of each of the segments is defined between a beam line extending from a beam emitter of an additive manufacturing instrument and a surface normal of a respective skin of the corresponding segment proximate to the beam line. The one or more processors are configured to select, based on the one or more geometrical characteristics of the segments that are determined, a first set of beam parameters for forming a first segment of the segments of the build part and a second set of beam parameters for forming a second segment of the segments of the build part. The second set of beam parameters includes a greater offset beam parameter than the first set based on the angle of incidence of the second segment being greater than the angle of incidence of the first segment.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION OF THE DISCLOSURE

Figure 1:
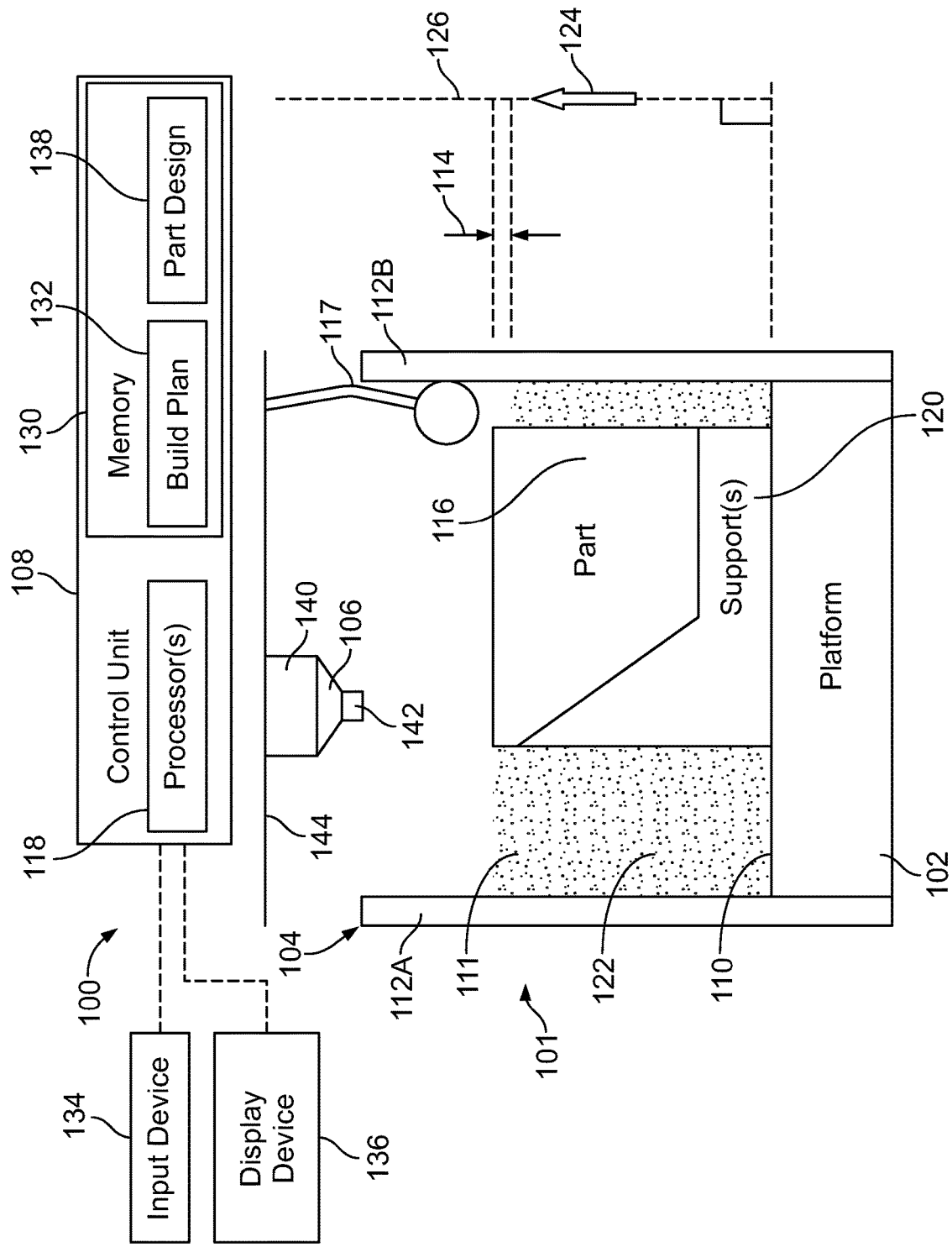
FIG. 1 is a schematic illustration of an additive manufacturing system according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

In consideration of the cost, time, and labor of performing surface treatments after the additive build process, there are several advantages in techniques for additively manufacturing build parts that have inherently improved surface quality, near-surface quality, and geometric accuracy, thereby eliminating or at least expediting post-build surface treatments. Embodiments of the present disclosure provide a system (e.g., an additive manufacturing system) and method for determining beam parameters for additively manufacturing build parts. The beam parameters refer to parameters of focused energy beams emitted from one or more beam emitters of an additive manufacturing instrument. The parameters may include power (e.g., intensity), scan speed, beam diameter, beam offsets, and/or the like. The focused energy beams melt and fuse source material within a stratum or layer of source material to an underlying surface layer of a partially-constructed build part to form or construct a new surface layer thereof. The beam parameters are determined such that different beam parameters are used to form different segments of a given build part during the build process. For example, a beam emitter may be controlled to emit focused energy beams according to a first set of beam parameters to form a first segment of a build part and to emit focused energy beams according to a different, second set of beam parameters to form a second segment of the build part.

The beam parameters for each corresponding segment of the build part are determined based at least in part on one or more geometrical characteristics of the respective segment. The one or more geometrical characteristics factor the position of the segment relative to the source of the focused energy beams (e.g., the beam emitter). One geometrical characteristic is an angle of incidence of the segment of the build part. The angle of incidence is the angle between a line extending from the beam emitter to a surface layer (e.g., top layer) of the segment and a surface normal vector of a skin (e.g., side surface) of the segment of the build part just below the surface layer that is being deposited/formed. The surface normal vector is a line extending orthogonally from a plane that is tangent to the skin of the segment most proximate to the impact point of the energy beam on the surface layer. The system and method may analyze a design of the build part in a candidate or proposed position on the platform to determine the one or more geometrical characteristics of the various segments of the build part. The system and method then utilize the determined geometrical characteristics to determine or select the corresponding beam parameters to use for constructing each of the segments of the build part during the additive manufacturing build process.

Optionally, the additive manufacturing instrument may include multiple beam emitters disposed at different locations relative to the build platform. The system and method may determine the geometrical characteristics of the various segments of the build part relative to each of the multiple beam emitters. In addition to determining the beam parameters, the system may determine which beam emitter to utilize for constructing each of the segments of the build part based on the geometrical characteristics.

The additive manufacturing system selects and assigns different sets of beam parameters for forming different segments of the build part. For example, the system may select and/or adjust the sets of beam parameters as a function of the determined geometrical characteristics of the segments relative to the one or more beam emitters. After determining the beam parameters, the additive manufacturing system may generate a build plan that incorporates the different sets of beam parameters. The additive manufacturing system may generate control signals for controlling the operations of the beam emitter (or emitters) according to the assigned sets of beam parameters. For example, the control signals may control the beam emitter to generate and emit focused energy beams having a first power level, a first beam diameter, and a first offset at a first scan speed along a designated scan path to form a first segment of the build part. To form a second segment of the build part, the control signals may control the beam emitter to generate and emit focused energy beams having one or more different parameters than the parameters used to form the first segment, such as a second power level, a second beam diameter, and/or a second offset.

By selecting and adjusting the parameters of the focused energy beams during the build process based on the positioning of the segments of the build part relative to the beam emitter, the surface quality of the build part can be improved relative to utilizing a single set of beam parameters or using multiple sets of beam parameters without consideration of the build part positioning relative to the beam emitter. Known additive manufacturing systems do not adapt or vary the beam parameters for forming different segments of a build part based on an analysis of geometrical characteristics of the build part relative to the beam emitter for the purpose of improving surface quality during the build process. As stated above, improving the surface and sub-surface quality during the build process can increase dimensional accuracy, increase manufacturing efficiency, and reduce costs by eliminating or at least expediting post-build surface finishing treatments.

The build part described herein refers to both a virtual object that is designed to be additively manufactured as well as a physical object produced via an additive manufacturing build process. The position or positioning of a build part within the additive manufacturing instrument refers to the location and orientation of the build part relative to the instrument. For example, the location can represent the specific area of a build platform of the additive manufacturing instrument on which the build part is constructed layer by layer. Often, multiple build parts are constructed during a common build process, so the build parts are arranged at different locations along an upper surface of the build platform. The orientation of the build part generally refers to a rotation and/or tilt of the build part relative to the instrument (e.g., the platform thereof). For example, the build part may be oriented about a longitudinal axis, and the orientation can indicate a rotation of the build part about the longitudinal axis and/or a tilt or lean of the longitudinal axis relative to a vertical axis.

The surface quality of a given surface can refer to a surface roughness, a porosity content of the wall defining the given surface, structural and/or compositional uniformity of the wall, and/or the like. Generally, higher quality surfaces of additively manufactured build parts have fewer pores, smaller pores, and are smoother (e.g., less rough) than lower quality surfaces. One or more of the embodiments described herein are configured to produce build parts that have desirable and/or satisfactory surface and sub-surface quality and dimensional accuracy to reduce the scrap rate and reduce the amount of surface finishing during post-processing after the build process.

FIG. 1 is a schematic illustration of an additive manufacturing system 100 according to an embodiment. The additive manufacturing (AM) system 100 includes an additive manufacturing (AM) instrument 101 and a control unit 108. The AM instrument 101 includes a build platform (or plate) 102, an enclosure 104, an electromagnetic energy source (referred to herein as a beam emitter) 106, and a source material applicator 117. Optionally, the AM instrument 101 also includes an input device 134 and a display device 136. The platform 102 is a planar surface of the of the AM instrument 101 and may be represented by a plate, a lower wall of the enclosure 104, or the like. The AM instrument 101 performs additive manufacturing build processes to form three-dimensional build parts 116. Each build part 116 is built up from an upper surface 110 of the platform 102 by selectively depositing a source material 111 in consecutive layers 114 and fusing the source material 111 at designated locations according to a build plan 132. Each layer 114 is relatively thin, such as no greater than 1 mm, no greater than 0.5 mm, no greater than 0.25 mm, or the like.

The AM system 100 in FIG. 1 can be utilized to perform powder bed fusion additive manufacturing techniques. Suitable additive manufacturing processes can include, for example, vat photopolymerization (e.g., stereolithography, digital light processing, continuous digital light processing, light emission diode, and/or the like), powder bed fusion (e.g., binder jetting, selective laser melting, and the like), material jetting (e.g., material jetting, nanoparticle jetting, drop on demand, and the like), and multi jet fusion. At least most of these processes involve depositing a layer of material on a build surface and fusing selective portions of the material using a form of energy and/or polymer binding agent that scans the surface based on a CAD pattern. Other processes involve powder-feed or wire-feed directed energy deposition (DED), in which material is only deposited on the build part without depositing a wide layer on the build surface and selectively fusing material from the layer.

The source material 111 may be in powder form. In a non-limiting example, the powder includes one or more metals in the form of metal particles, flakes, or the like. The powder optionally can also include non-metallic filler materials intermixed with the metal material. The metal material may include various metal types, such as aluminum, stainless steel, copper, nickel, cobalt, titanium, or the like, and alloys of the various metal types. Possible non-metallic filler materials within the powder can include ceramics, polymers (e.g., plastics), silica, or the like. The powder that is deposited but is not fused to form part of the build part 116 defines a powder bed 122 of unused material 111 that is contained within walls 112 of the enclosure 104. In an embodiment, the part 116 is encased within the powder bed 122 during the build process. In an alternative embodiment, the source material 111 is free of metals.

The build part 116 is gradually formed or constructed by aggregating layers 114 in a build direction 124 along a build axis 126. With each successive addition of material 111 to the top of the part 116, the part 116 grows in the build direction 124. The build direction 124 extends away from the platform 102. In the illustrated embodiment, build axis 126 is orthogonal to a plane of the upper surface 110 of the platform 102.

The AM instrument 101 generates new layers of the part 116 by spreading a thin layer or stratum of the powder material 111 over the top of the part 116. For example, the source material applicator 117 of the AM instrument 101 deposits each layer 114 of material 111. The source material applicator 117 includes or represents a spreader or re-coater device that evenly spreads a thin layer of the material 111, an injector that injects the material 111, or the like. The material 111 can be stored in a reservoir prior to use. The source material application 117 is controlled by the control unit 108.

Then, the beam emitter 106 is controlled by the control unit 108 to emit focused electromagnetic energy towards the source material 111 in the top surface layer 114. The focused electromagnetic energy can be in the form of beams that impinge upon the stratum of the powder, causing a selected portion of the stratum to melt and adhere to the part 116 to form a new top portion thereof. The beam emitter 106 can be a laser device that generates high energy laser beams. In an embodiment, the beam emitter 106 is suspended above the top of the powder bed 122. For example, the beam emitter 106 may be disposed about 0.5 meters (m) above the upper surface 110 of the platform 102. The focused energy beams emitted from the beam emitter 106 may be aimed at or directed to different locations of the power bed 122 to fuse different selected portions of the top layer 114 to the part 116. The beam emitter 106 may include a scanning head 142 that enables directing the beams to different locations within a designated coverage area without moving (e.g., displacing) the location of the beam emitter 106 relative to other components of the AM instrument 101. The orientation of the scanning head and parameters of the energy beams (e.g., timing, energy intensity, beam size, etc.) may be controlled by the control unit 108 via control signals. The process consecutively repeats according to instructions within the build plan 132 until the build part 116 is fully formed.

The AM instrument 101 may be controlled, according to the build plan 132, to form one or more external supports 120 during the build process for structurally supporting overhanging features of the build part 116. The one or more external supports 120 are additively formed during the same build process that forms the build part 116. For example, the build part 116 and the external supports 120 are both composed of a series of stacked material layers that are fused together during an additive manufacturing build process. Optionally, the internal structure (e.g., density, lattice, etc.) and/or material composition of the external supports 120 may be different than the build part 116. For example, the structure of the external support 120 may be less dense than the structure of the build part 116.

The control unit 108 represents hardware circuitry that includes and/or is connected with one or more processors 118 (e.g., one or more microprocessors, integrated circuits, microcontrollers, field programmable gate arrays, etc.) that perform operations described in connection with the control unit 108. The one or more processors 118 may operate based on programmed instructions. The one or more processors 118 may include a single processor or multiple processors that operate to perform the functions described herein. The one or more processors 118 are referred to herein in the plural form "processors" without limiting the scope to require multiple processors 118. The control unit 108 also includes a tangible and non-transitory computer-readable storage medium (e.g., memory) 130. The memory 130 may store the programmed instructions (i.e., software) that dictate the operations of the processors 118. For example, the memory 130 stores the build plan 132 associated with the build part 116 that is being fabricated.

The memory 130 may also store a part design file 138 of the build part 116. The part design file 138 may be a computer-aided design (CAD) file or another data file that describes the physical characteristics of the part 116, such as the shape, size, and/or composition of the part 116. The build plan 132 may be generated based on the part design file 138. For example, the build plan 132 may be a data file that dictates parameters, conditions, settings, and/or operations of the AM instrument 101 in order to produce a physical build part 116 which is a replica or match of the virtual part defined by the design file 138. One or more parameters or settings dictated by the build plan 132 may include a positioning of the build part 116 on the platform 102, a sequence of actions taken by the AM instrument 101 to build the part 116 (e.g., a path for the focused energy beam), the locations of supports 120, and the like. The sequence of actions to be taken by the AM instrument 101, as designated in the build plan 132, can include a designated scan path along which a scanning head of the beam emitter 106 is to direct focused energy beams. Additional parameters specified in the build plan 132 may include settings of the energy beams (e.g., power, timing, beam size, etc.), offsets, layer thicknesses, gas flow parameters, and the like. The control unit 108 (e.g., the processors 118 thereof) controls the operations of the one or more beam emitters 106, the source material applicator 117, and/or other components based on the build plan 132 to produce the build part 116.

In the illustrated embodiment, the input device 134 and the display device 136 are communicatively connected to the processors 118 of the control unit 108. The input device 134 may include a touchpad, a touchscreen, a keyboard, a mouse, physical buttons, a joystick, or the like. The input device 134 enables an operator to provide commands to the AM system 100. In a non-limiting example, the operator can use the input device 134 to select and/or modify a candidate position of the build part 116 on the platform 102, to initiate the build process, to select and/or adjust additional settings and parameters of the AM instrument 101, and the like. The display device 136 includes a display screen that is configured to display information to the operator, such as to enable the operator to select specific settings. Optionally, the input and display devices 134, 136 may be integrated together within a unitary device, such as a laptop computer, a desktop computer, a workstation, a tablet computer, a mobile, hand-held computing device (e.g., smartphone), or the like. The processors 118 may be operably connected to the input device 134 and/or the display device 136 via a wired or wireless communication pathway.

In one embodiment, the processors 118 of the control unit 108 are configured to generate the build plan 132. For example, the processors 118 may access the part design file 138 that is stored in the memory 130. The design file 138 can be received from a remote computing device or generated locally via operator inputs on the input device 134. The processors 118 may receive user inputs selecting a candidate position of the build part 116 on the platform 102. The processors 118 may generate the build plan 132 based on the design of the part 116 and the selected position of the part 116. In an alternative embodiment, the processors 118 do not generate the build plan 132, but rather implement instructions that are generated remote from the AM instrument 101. For example, machine instructions may be processed externally by a computer or processing unit and transferred to the AM instrument 101 to be performed by the AM instrument 101.

Figure 2:
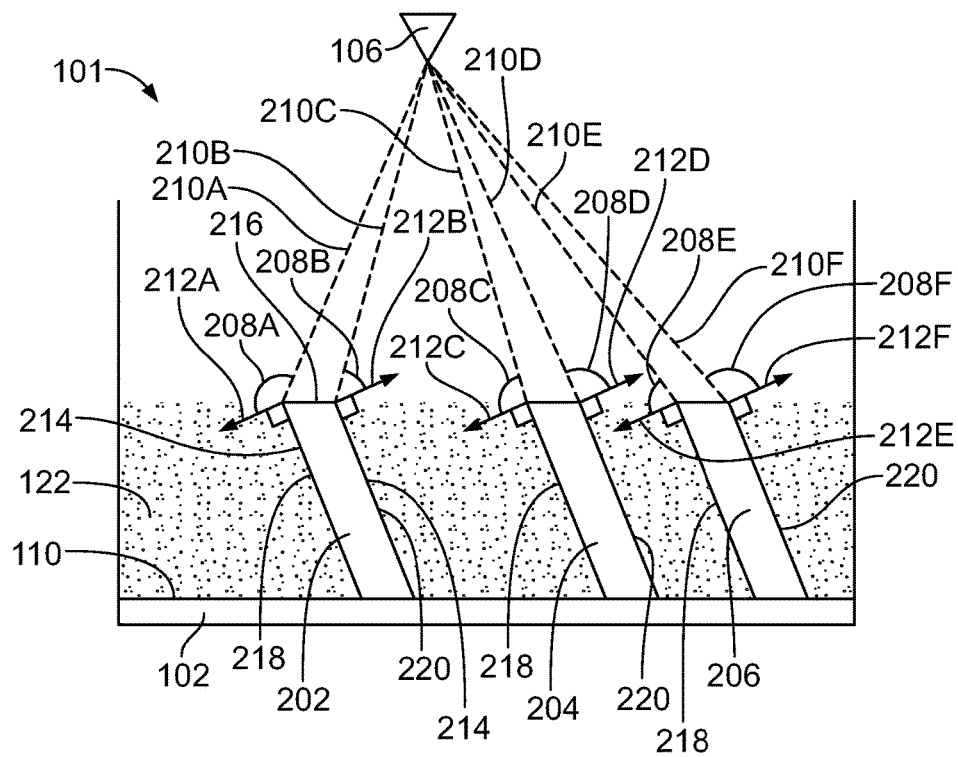
FIG. 2 illustrates a schematic diagram of an additive manufacturing instrument of the additive manufacturing system according to an embodiment.

FIG. 2 illustrates a schematic diagram of the AM instrument 101 forming three coupons 202, 204, 206 according to an embodiment. The coupons 202, 204, 206 are discrete and spaced apart from one another, but may be representative of different segments of a single build part, such as the part 116 shown in FIG. 1, that will subsequently conjoin during the build process. The coupons 202, 204, 206 have the same size, shape, and orientation relative to the platform 102. Furthermore, the coupons 202, 204, 206 are formed using the same materials and the same parameters of the beam emitter (e.g., energy source) 106. The coupons 202, 204, 206 are encased within a powder bed 122. The only differences between the coupons 202, 204, 206 are in the positioning of the coupons 202, 204, 206 relative to the AM instrument 101. In an embodiment, beam parameters for the additive manufacturing build process are determined by analyzing one or more geometrical characteristics of the proposed build part relative to the AM instrument 101.

The one or more geometrical characteristics include an angle of incidence 208 of different respective segments of the build part (e.g., the coupons 202, 204, 206) to the beam emitter 106. The angle of incidence represents the angle between a beam line 210 and a line 212 normal to the skin 214 (e.g., side surface) of the respective coupon segment. The beam line 210 represents the path of a laser beam or other focused energy beam that is emitted or would be emitted from the beam emitter 106 to a surface layer 216 (e.g., top layer) of the respective coupon segment to generate the surface layer 216. The surface layer 216 is the most-recently formed layer at a given time that is at the top (e.g., end) of the layer stack. The skin 214 represents the side surface (e.g., edge) of one or more layers of the respective coupon immediately below the surface layer 216 and proximate to the beam line 210. The line or vector 212 is perpendicular to the skin 214. If the skin 214 is curved (e.g., non-planar), the line 212 can be normal to a tangent of the curved skin 214 at a location just below the surface layer 216. The build parts are three-dimensional, so the lines 212 of different skin segments of the same or different parts can have different vertical, lateral, and/or longitudinal or depth components relative to the beam emitter 106. The angle of incidence 208 as described herein is based on the positioning (e.g., location and orientation) of a given segment of a build part relative to the beam emitter 106. For example, the normal line 212 is affected by the orientation of the skin 214, and the beam line 210 is affected by the location of the segment (e.g., the skin 214) relative to the beam emitter 106.

The one or more geometrical characteristics optionally also include an orientation of different respective segments (or skins 214) of the coupons 202, 204, 206 relative to horizontal. The orientation of each skin 214 can refer to a tilt angle defined between the skin 214 (or a tangent line extending from a curved skin 214) and the upper surface 110 of the platform 102 on which the coupons 202, 204, 206 are constructed. The three coupons 202, 204, 206 in FIG. 2 have the same sizes and shapes and the same orientations relative to the platform 102. The first, second, and third coupons 202, 204, 206 are overhanging objects in the illustrated embodiment. The coupons 202, 204, 206 each include a respective downskin 218 that faces generally towards the platform 102 and an upskin 220 that is opposite the downskin 218. The upskins 220 generally face upward away from the platform 102. The downskins 218 of the first, second, and third coupons 202, 204, 206 all have the same orientations relative to the platform 102 in FIG. 2. The upskins 220 of the coupons 202, 204, 206 also have the same orientations relative to the platform 102.

The three coupons 202, 204, 206 have different positions relative to the beam emitter 106, which are indicated by different angles of incidence 208. For example, the first coupon 202 defines a first angle of incidence 208A between the line 212A normal to the respective downskin 218 and a first beam line 210A. The first coupon 202 defines a second angle of incidence 208B between the line 212B normal to the respective upskin 220 and a second beam line 210B. The second coupon 204 defines a third angle of incidence 208C between the line 212C normal to the respective downskin 218 and a third beam line 210C. The second coupon 204 defines a fourth angle of incidence 208D between the line 212D normal to the respective upskin 220 and a fourth beam line 210D. The third coupon 206 defines a fifth angle of incidence 208E between the line 212E normal to the respective downskin 218 and a fifth beam line 210E. The third coupon 206 defines a sixth angle of incidence 208F between the line 212F normal to the respective upskin 220 and a sixth beam line 210F. In the illustrated embodiment, the first, third, and sixth angles of incidence 208A, 208C, 208F are obtuse (e.g., greater than 90 degrees). The skins 214 associated with obtuse angles of incidence are referred to herein as outskins for reasons provided below. The second and fifth angles of incidence 208B, 208E are acute (e.g., less than 90 degrees). The skins 214 associated with acute angles of incidence are referred to herein as inskins. The fourth angle of incidence 208D is a right angle (e.g., 90 degrees). Skins 214 associated with right angles of incidence represent an inflection or tipping zone between outskins and inskins.

Experimental testing has demonstrated that the angle of incidence 208 between the beam line 210 and the line 212 normal to the skin 214 can significantly impact the formation of the build part, such as the surface quality, near-surface quality (e.g., porosity), and dimensional accuracy. For example, in an experimental setup similar to that shown in FIG. 2, it was determined that outskins, in which the angle of incidence 208 is greater than a designated threshold angle, have significantly worse properties (e.g., surface and near-surface quality, porosity, and dimensional accuracy) than inskins, in which the angle of incidence 208 is less than the designated threshold angle, even though all test parameters were the same. The designated threshold angle may be an angle defined from 70 degrees to 110 degrees, such as 70 degrees, 80 degrees, 90 degrees, 100 degrees, or the like. More specifically, the threshold angle can be an angle between 80 degrees and 100 degrees. In a non-limiting embodiment, the designated threshold angle is 90 degrees. When the designated threshold angle is 90 degrees, obtuse angles of incidence are classified as outskin, and acute angles of incidence are classified as inskin. The outskins shown in FIG. 2 include the downskin 218 of the first coupon 202, the downskin 218 of the second coupon 204, and the upskin 220 of the third coupon 206. The inskins shown in FIG. 2 include the upskin 220 of the first coupon 202 and the downskin 218 of the third coupon 206. These results indicate that some downskin surfaces 218 can be inskins (e.g., the downskin 218 of the third coupon 206) and other downskin surfaces 218 can be outskins (e.g., the downskins 218 of the first and second coupons 202, 204), which have degraded properties relative to the inskins. Similarly, some upskin surfaces 220 can be inskins (e.g., the upskin 220 of the first coupon 202) and other upskin surfaces 220 can be outskins (e.g., the upskin 220 of the third coupon 206).

A potential explanation for this phenomenon is different local absorption of the focused beam energy due to different incident angles of the laser beam relative to the proximal part geometry, as suggested in S. Kleszczynski, A. Ladewig, K. Friedberger, J. zur Jacobsmühlen, D. Merhof, and G. Witt (2015). Position Dependency of Surface Roughness in Parts from Laser Beam Melting Systems. 26th International Solid Free Form Fabrication (SFF) Symposium, USA, pp 360-370, which is incorporated by reference herein in its entirety. For example, when forming a surface layer 216 along or proximate to an outskin surface (e.g., which defines an angle of incidence 208 greater than 90 degrees), some of the energy of the focused beam may be absorbed into the underlying powder within the powder bed 122, which affects the melt pool.

Figure 3:
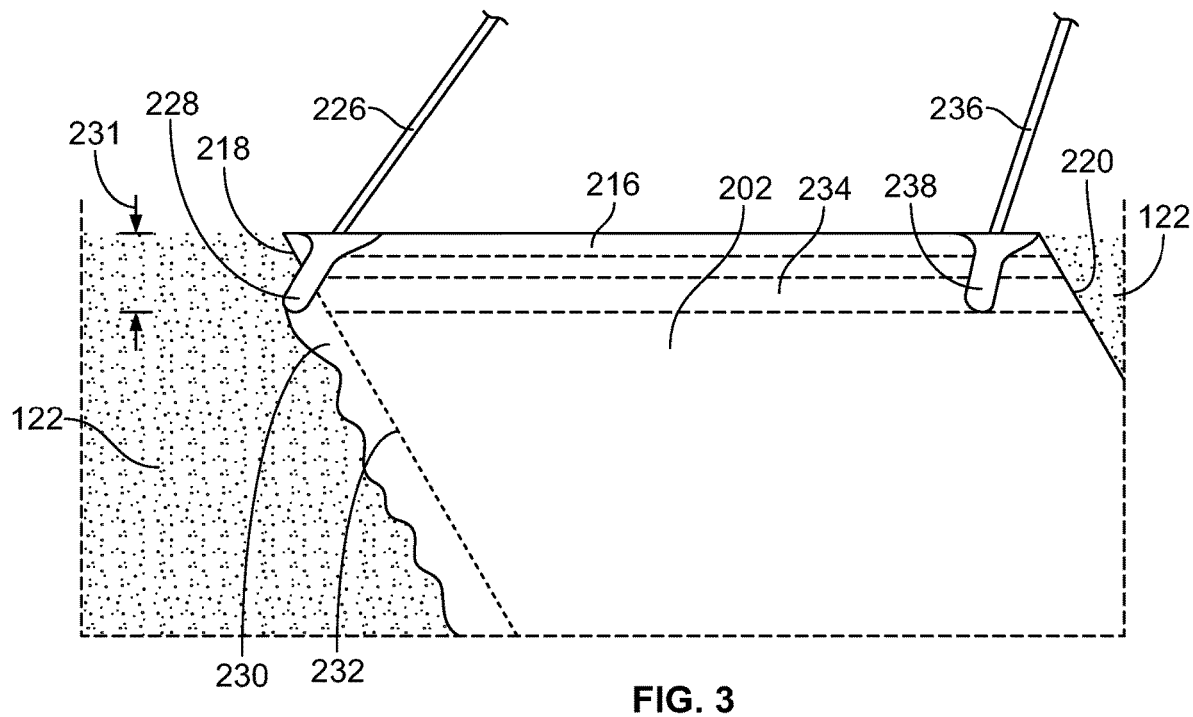
FIG. 3 illustrates a close-up portion of a first coupon shown in FIG. 2.

FIG. 3 illustrates a close-up portion of the first coupon 202 shown in FIG. 2. A laser beam 226 impinges upon the surface layer 216 proximate to the downskin 218 of the coupon 202. Because the angle of incidence 208A between the laser beam 226 and the line 212A normal to the downskin 218 is greater than 90 degrees, as shown in FIG. 2, the downskin 218 is classified as an outskin. The high energy laser beam 226 melts the source material, causing a melt pool 228. The shape of the melt pool 228 may not accurately accommodate for the part dimension, at least along areas proximate to the outskin. For example, the melt pool 228 in FIG. 3 penetrates a depth 231 that extends beyond the desired downskin edge 232 of the coupon 202, such that the energy of the beam 226 blows out into the powder bed 122. The energy absorbed by the powder can cause additional, undesired material, referred to herein as melt extensions 230, to form along the downskin surface 218 as the material cools and solidifies. The melt extensions 230 can increase surface roughness (e.g., reduce surface quality), porosity, and dimensional inaccuracy, relative to forming the coupons without melt extensions. The dimensional inaccuracy refers to the increased thickness or lateral width of the downskin 218 relative to the thickness/lateral width defined by the desired downskin edge 232. It is noted that the top-most layer or layers, including the surface layer 216, may be dimensionally accurate, at least at the current time during the build process. The laser penetration causes the previously-formed layers below the top-most layer or layers to grow. In FIG. 3, for example, the melt pool 228 causes melt extensions 230 to grow along the layer 234 that is two layers below the surface layer 216. The melt extensions 230 aggregate during the additive build process as additional layers of material are formed.

With continued reference to FIG. 2, the angle of incidence 208B at the upskin 220 of the first coupon 202 is quite different from the angle of incidence 208A at the downskin 218 of the first coupon 202. The angle of incidence 208B is acute, indicating that the upskin 220 of the first coupon 202 represents an inskin. Inskins are associated with improved quality characteristics, such as surface quality, near-surface quality, porosity, and dimensional accuracy, relative to outskins. The variation in quality may be attributable to the geometry of the build part underlying the newly-deposited surface layer 216. For example, energy from a laser beam 236 that is directed along the beam line 210B shown in FIG. 2 may be absorbed by the partially solidified or consolidated underlying material of the first coupon 202, resulting in less energy directed beyond the upskin 220 boundary and into the powder bed 122 (compared to the downskin 218). The melt pool 238 formed by the laser beam 236 may not penetrate through the upskin 220 boundary due to the angle of the beam 236 relative to the geometry of the coupon 202. For example, the melt pool 238 extends at least partially inward towards a lateral center of the coupon 202. Essentially, there is more of the partially solidified underlying material of the coupon 202 present to absorb the energy of the beam 236 than the amount of underlying material present to absorb the energy of the beam 226. As a result, there is less heating of the powder bed 122 along the upskin 220 than the amount of heating of the powder bed 122 along the downskin 218. Fewer melt extensions and other non-uniformities form along the upskin surface 220, which improves the surface quality and near-surface quality, the dimensional accuracy, and the porosity relative to the downskin 218.

As shown in FIG. 2, the angle of incidence 208D at the upskin 220 of the second coupon 204 is a right angle, which indicates that the beam line 210D is collinear with the angle of the upskin 220 just below the layer of material being deposited or most recently deposited. The upskin 220 of the second coupon 204 represents a tipping or inflection zone between the inskins and the outskins.

Figure 4:
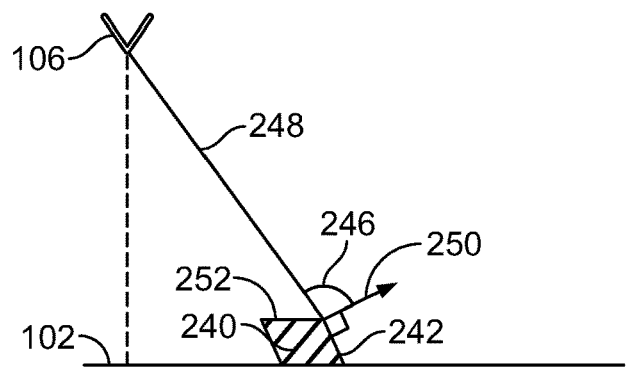
FIG. 4 illustrates a schematic diagram of the additive manufacturing instrument during a first stage in the construction of a single coupon according to an embodiment of the present disclosure.
Figure 5:
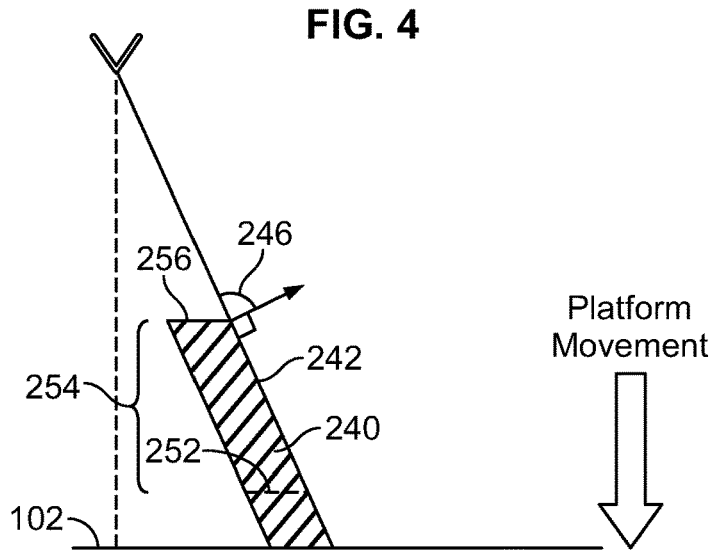
FIG. 5 illustrates a schematic diagram of the additive manufacturing instrument during a second stage in the construction of the coupon shown in FIG. 4.
Figure 6:
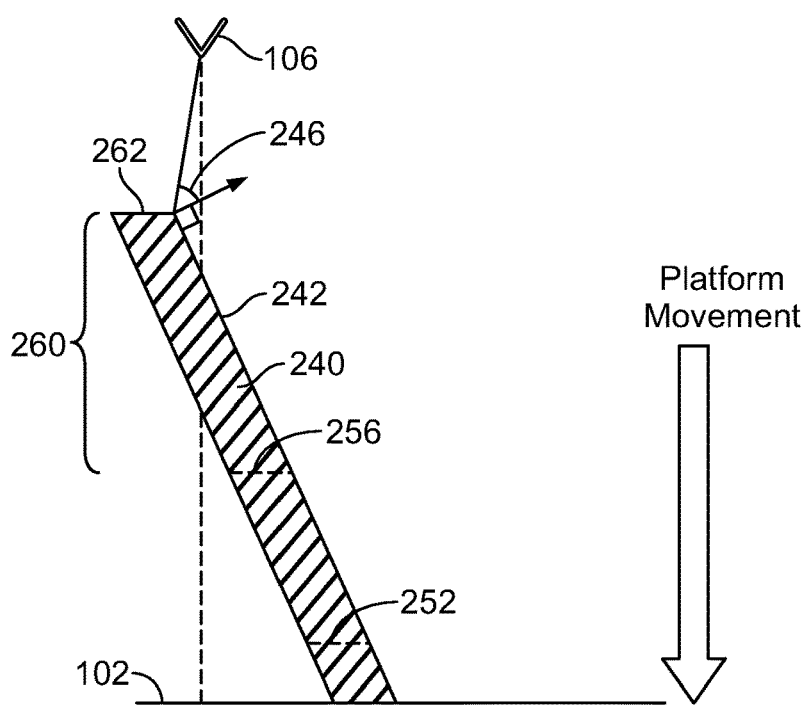
FIG. 6 illustrates a schematic diagram of the additive manufacturing instrument during a third stage in the construction of the coupon shown in FIGS. 4 and 5.

During the additive manufacturing process in which layers of material are consecutively deposited in a stack according to a designated build part geometry, the angle of incidence of a given skin of the build part relative to the beam emitter can change over time. For example, FIGS. 4-6 illustrate three different stages in the construction of a single coupon 240 over time by the AM instrument 101 according to an embodiment. The stages are chronological, such that the stage shown in FIG. 4 is prior to the stages shown in FIGS. 5 and 6, and the stage shown in FIG. 5 is before the stage shown in FIG. 6. FIGS. 4-6 show the effects of a part being built with a platform 102 that gradually drops (e.g., moves away from the beam emitter 106) as additional layers of material are deposited. The beam emitter 106 is disposed in the same position at each of the three illustrated stages of the build process, such that the beam emitter 106 is not moved. The coupon 240 that represents the build part in FIGS. 4-6 has a rhomboid shape with parallel, linear upskin 242 and downskin 244 surfaces.

The angle of incidence 246 at the upskin 242 relative to the beam emitter 106 changes over time as the coupon 240 is constructed. As described above, the relevant angle of incidence 246 is defined between a beam line 248 from the beam emitter 106 and the line 250 normal to the portion of the upskin 242 proximate to the current surface layer 252 of the coupon 240. In FIG. 4, the angle of incidence 246 is an obtuse angle (e.g., greater than 90 degrees), which indicates that the upskin 242 has an outskin classification. The segment of the coupon 240 formed at or proximate to the upskin 242 may have a degraded quality and/or accuracy that requires additional finishing steps post-build to increase the smoothness and/or provide proper dimensional alignment.

FIG. 5 shows that the platform 102 has moved and an additional portion 254 of the coupon 240 has been formed subsequent to the stage shown in FIG. 4. The additional portion 254 extends from the previous surface layer 252 to a current surface layer 256. In the illustrated stage, the angle of incidence 246 based on the upskin 242 is a right angle, which indicates that the upskin 242 is at the tipping or inflection zone between the outskin and inskin classifications. The segment of the coupon 240 formed at or proximate to the upskin 242 at the surface layer 256 is expected to have better quality and/or accuracy than the upskin 242 at the previous surface layer 252 due to the difference in angle of incidence 246.

FIG. 6 shows that the platform 102 has moved farther away from the fixed beam emitter 106 than shown in FIG. 5, and an additional portion 260 of the coupon 240 has been formed subsequent to the stage shown in FIG. 5. The additional portion 260 extends from the previous surface layer 256 to a current surface layer 262. In the illustrated stage, the angle of incidence 246 based on the upskin 242 is an acute angle (e.g., less than 90 degrees), which indicates that the upskin 242 has an inskin classification. The segment of the coupon 240 formed at or proximate to the upskin 242 at the surface layer 262 is expected to have better quality and/or accuracy than the upskin 242 at the previous surface layers 256, 252 due to the angle of incidence 246 differences.

FIGS. 4-6 show that, as the rhomboid coupon 240 grows taller and the positioning of the surface layer changes relative to the beam emitter 106, the upskin 242 transitions from representing an outskin to an inskin. The system disclosed herein evaluates the build part geometry at multiple segments of the build part even along a single skin or surface. Optionally, the build part geometry may be evaluated layer by layer for classification as either an outskin, an inskin, or an inflection zone between the outskin and the inskin. The system determines the beam parameters based on the one or more geometrical characteristics, such as angles of incidence. According to the example above, the system may select at least a first set of beam parameters for forming the segments (or layers) of the upskin 242 classified as outskin and at least a second set of beam parameters for forming the segments (or layers) of the upskin 242 classified as inskin. Thus, the AM instrument may be controlled to switch beam parameters during the build part as the upskin 242 transitions from an outskin to an inskin based on the determined geometrical characteristics in order to provide improved quality of the coupon 240.

Figure 7:
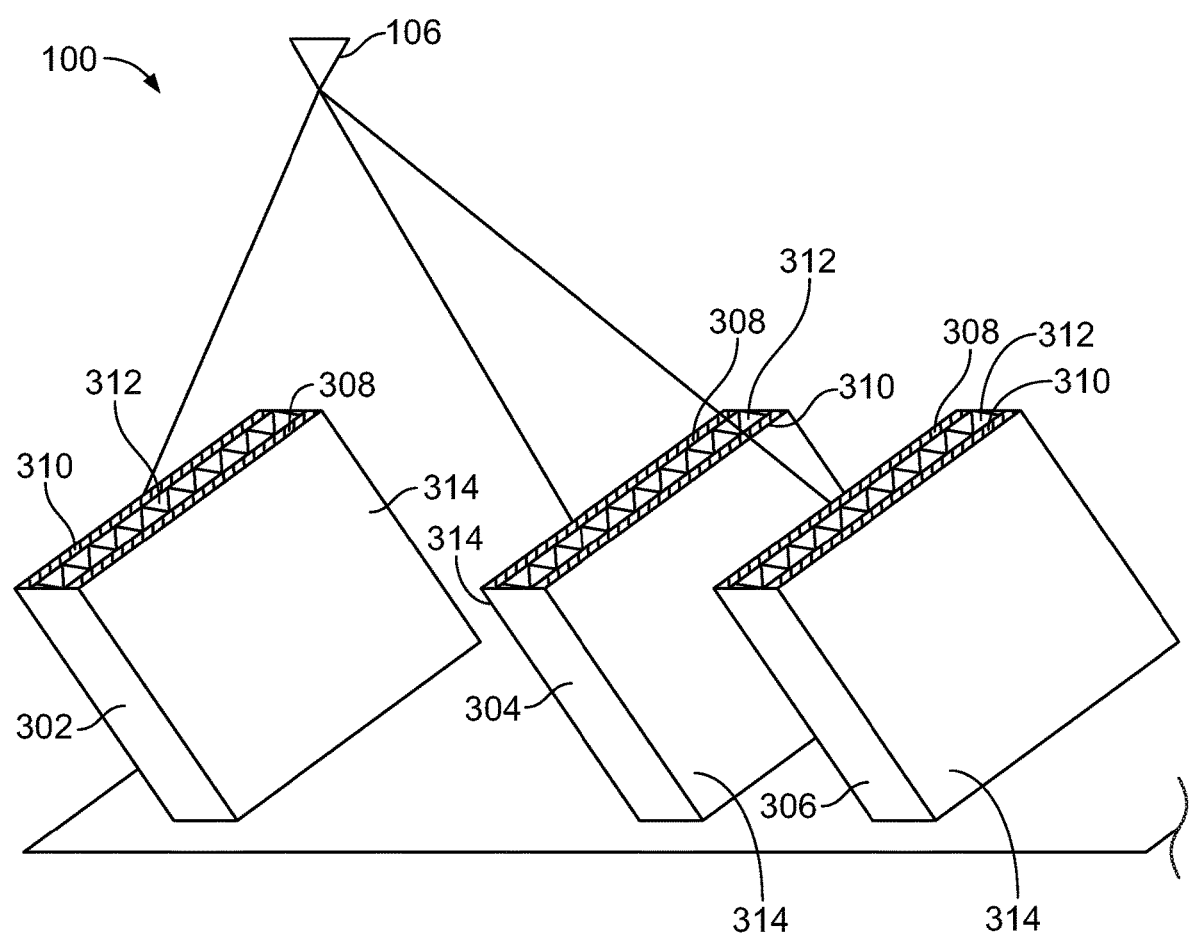
FIG. 7 is perspective view of three build parts or coupons being formed by the additive manufacturing instrument during a build process according to an embodiment.

FIG. 7 is a perspective view of three build parts or coupons 302, 304, 306 being formed by the AM instrument 101 during a build process according to an embodiment. The perspective view shows that the coupons 302, 304, 306 can have different infill regions across the respective thicknesses of the coupons 302, 304, 306. For example, each of the coupons 302, 304, 306 in FIG. 7 has three infill regions including an inside infill region 308, an outside infill region 310, and an interior infill region 312. The inside infill region 308 faces towards the beam emitter 106. The outside infill region 310 is opposite the inside infill region 308, and the interior infill region 312 is between the regions 308, 310. The inside and outside infill regions 308, 310 are adjacent to respective skin surfaces 314 of the coupons 302, 304, 306 and are also referred to herein as contour regions 308, 310. Typically, all parts of a build part are first infilled with a single set of beam parameters that correspond to the interior infill region 312, and then the beam emitter 106 makes a final pass along the perimeter to according to designated contour beam parameters for providing a uniform, continuous perimeter surface. Depending on the angle of incidence at a given layer of the respective coupon 302, 304, 306, each skin surface 314 can represent an inskin, an outskin, or an inflection zone. The inflection zone represent one or more angles including an inflection or tipping point between the inskin and outskin. The inflection zone may represent a range, such as 70 degrees to 110 degrees, 80 degrees to 100 degrees, or the like. Optionally, the inflection point may be a single angle, such as 90 degrees. The angle of incidence can be compared to one or more designated threshold angles.

Although a single designated threshold angle is described above, the system may incorporate multiple designated threshold angles to which the angles of incidence are compared to determine the assigned beam parameters. For example, a first threshold angle may be 80 degrees and a second threshold angle may be 100 degrees. Whether a given angle of incidence is below the first threshold angle, between the two threshold angles, or above the second threshold angle affects the beam parameters that are assigned to the corresponding segment, as described herein. Segments with angles of incidence less than the first threshold angle may be characterized as inskins, segments with angles of incidence above the second threshold angle may be characterized as outskins, and segments with angles of incidence between the two thresholds may be characterized as inflection zone skins.

In a non-limiting example, at a given layer of the first coupon 302, the inside infill region 308 is determined to include or be adjacent to an inskin surface and the outside infill region 308 is determined to include or be adjacent to an outskin surface. The AM system 100 can utilize different beam parameters (e.g., laser settings) for forming the inside infill region 308, the outside infill region 310, and the interior infill region 312 in the same layer of the build process.

The infill regions 308, 310, 312 can represent different segments of the build parts or coupons 302, 304, 306. The coupons 302, 304, 306 may be partitioned into segments having designated thicknesses and heights. A first segment of the first coupon 302 may represent the inside infill region 308 along a first three layers of the coupon 302 from the platform. A second segment of the first coupon 302 may represent the inside infill region 308 along the next three layers (e.g., layers four through six) of the coupon 302. A third segment of the first coupon 302 may represent the outside infill region 310 along the first three layers, and a fourth segment can represent the interior infill region 312 along the first three layers. Fifth and sixth segments can represent the outside and interior infill regions 310, 312, respectively, along the fourth through sixth layers. In an embodiment, the AM system 100 determines the one or more geometrical characteristics for most if not all of the segments and can select or determine the beam parameters for forming the segments based on the determined geometrical characteristics. Typical additive manufacturing systems utilize a single, default set of parameters for forming the bulk, interior infill region, but the AM system 100 optionally can select or modify beam parameters used to form the interior infill region 312 based on a determined angle of incidence of a given segment of the interior infill region 312.

For example, although the interior infill region 312 is spaced apart from the outer surfaces, a large angle of incidence between the interior infill and the beam emitter 106 can cause the laser to burn through into an adjacent region of the build part in the one or more underlying layers, which can degrade the quality (e.g., dimensional accuracy, porosity, uniformity, etc.) of the adjacent infill region and possibly even the perimeter surface adjacent to the infill region. The AM system 100 may alter the beam parameters for the interior infill region 312 at different segments along the height of the coupons, based on the geometrical characteristics, to reduce or avoid the melt pool interfering with the adjacent infill regions. Optionally, the AM system 100 may also move the location of the source of the laser beams, such as by moving the beam emitter 106 or using a different beam emitter, to reduce the angle of incidence between the laser source and the interior infill region 312.

After partitioning the proposed part design into multiple segments (e.g., based on different layers along the height and/or different infill regions along the thickness or width) and determining the one or more geometrical characteristics for each of the segments, the AM system 100 determines the beam parameters to be used for forming each of the segments during the build process. Determining the beam parameters based at least in part on the geometrical characteristics, such as the angle of incidence, can result in improved overall quality of the build part relative to selecting beam parameters without consideration of the effects of the geometrical characteristics on the resulting quality.

The beam parameters may include power, scan speed, beam size (e.g., width or diameter), offset, and/or the like. The beam parameters affect the melt pool shape that melts and fuses the source material onto the build part during the build process. The power beam parameter refers to an energy intensity of the focused energy beams. The scan speed parameter refers to how fast the beam emitter 106 moves the focused energy beams from point to point along a scan path prescribed in the build plan 132. The scan speed also relates to the duration of time at which each point along the scan path is impinged by the focused energy beams. For example, a faster scan speed may direct focused energy beams or pulses to a particular area of the build part for a shorter amount of time than a slower scan speed because the emitter 106 is quicker to move on to the next point along the scan path. The beam emitter 106 may have a scanning head for directing the focused energy beams to different points along the scan path. The diameter parameter refers to a width or diameter dimension of the focused energy beams emitted by the beam emitter 106. The offset beam parameter refers to a designated spacing from an edge of the build part to account for the size and shape of the melt pool. The difference in offsets between process parameter types (e.g., infill regions) may control the overlap between the parameter types, such as the overlap between hatch and contour parameter types.

In a non-limiting example, the processors 118 of the AM system 100 may determine or select a first set of beam parameters for forming a first segment of the build part, a second set of beam parameters for forming a second segment, and a third set of beam parameters for forming a third segment. The three sets of beam parameters may differ in at least one beam parameter. For example, one or more of the beam parameters may be common to multiple sets. The evaluation to determine the appropriate parameters may be performed on a layer-by-layer basis and may vary over the height of the build part, such that the first, second, and third segments can be different layers of the build part. In addition, the evaluation may be performed on a location-bylocation basis along a circumference of the build part, such that multiple segments may be disposed along a common layer (e.g., at the same height of the build part).

In an embodiment, one or more of the beam parameters may be selected based on the angle of incidence between the respective segment of the build part and the beam emitter that will emit the laser beam to form the segment. For example, the AM system 100 may correlate and/or link the angle of incidence to a specific value of the corresponding beam parameter. In a non-limiting example, in response to determining that a given segment of the build part is classified as an inskin, the processors 118 may select a first offset parameter for forming the given segment. The processors 118 may select a different, second offset parameter for forming the given segment in response to determining that the given segment is classified as an outskin. In an embodiment, the offset selection may be more dynamic than the binary example above, assigning offsets according to three or more ranges of incidence angles. For example, two inskin segments may be assigned different offset parameter values if the incidence angles of the inskin segments are within different designated ranges associated with the two offset parameter values. In a non-limiting example, a first segment that has a 90 degree angle of incidence (e.g., is at an inflection point) may be assigned an offset of 50 microns, a second segment that is an outskin with a 125 degree angle of incidence may be assigned an offset of 75 microns, and a third segment that is an outskin with a 170 degree angle of incidence may be assigned an offset of 100 microns. The processors 118 of the AM system 100 may access and utilize a function that dynamically correlates the angle of incidence with the beam parameters to determine the parameters. For example, based on the function, the assigned offset for an angle of incidence of 95 degrees may differ, at least slightly, from the offset assigned for an angle of incidence of 100 degrees.

Figure 8:
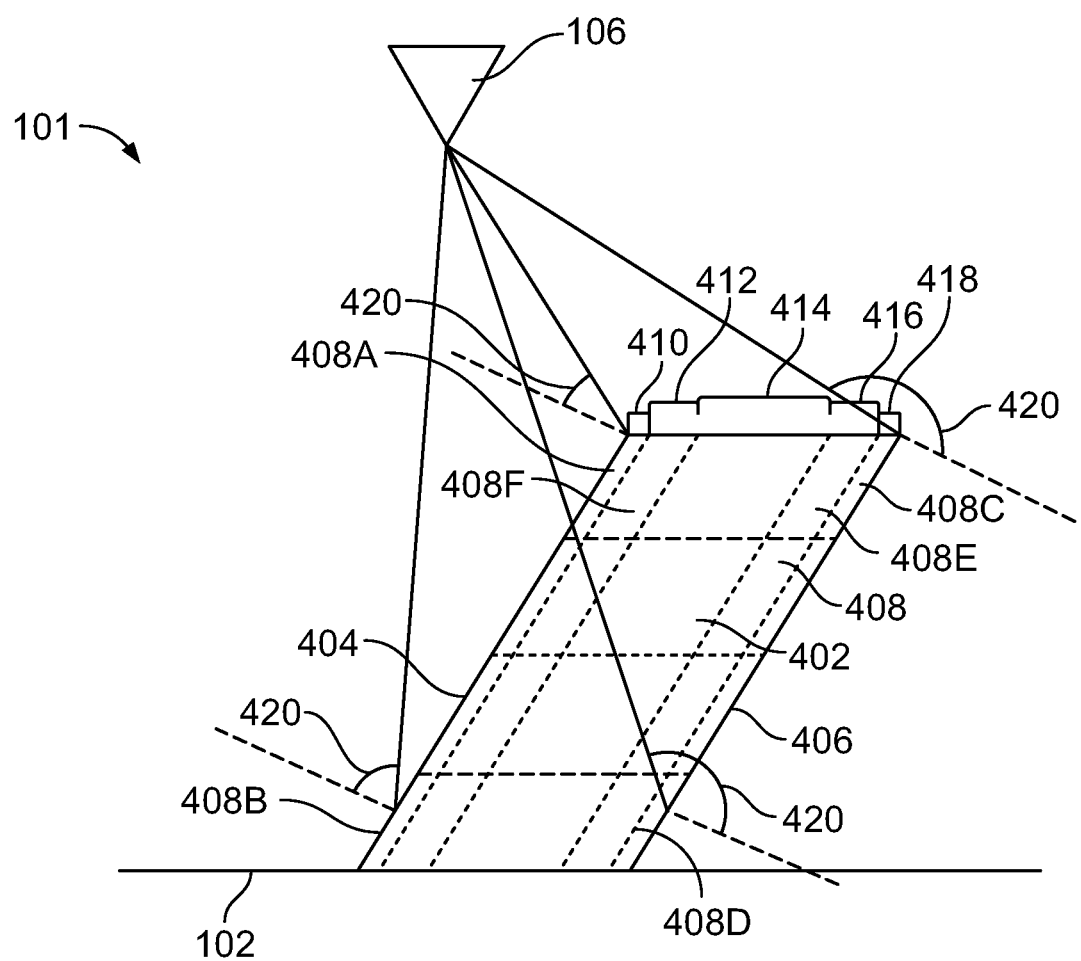
FIG. 8 illustrates a schematic diagram of the additive manufacturing instrument showing a build part on the platform according to an embodiment of the present disclosure.

FIG. 8 illustrates a schematic diagram of the additive manufacturing (AM) instrument 101 showing a build part 402 on the platform 102 according to an embodiment of the present disclosure. The build part 402 is being additively manufactured according to the system and method described herein that factor one or more geometrical characteristics of different segments of the build part to adapt or modify the beam parameters of the focused energy beams emitted by the beam emitter 106 to form the different segments. The location of the build part 402 may be based on a candidate position of the build part 302 that is selected by an operator or automatically determined. The build part 402, according to a planned design, has a parallelogram shape that includes an inside or upskin surface 404 and an opposite outside or downskin surface 406.

The one or more processors 118 of the AM system 100 (shown in FIG. 1) partition the proposed build part 402 into multiple segments 408. In the illustrated embodiment, the build part 402 is (virtually) partitioned across the width or thickness into an inside contour region 410, an inside infill region 412, an interior infill region 414, an outside infill region 416, and an outside contour region 418. The inside contour region 410 defines the inside surface 404, and the outside contour region 418 defines the outside surface 406. The inside infill region 412 is between the inside contour region 410 and the interior infill region 414. The outside infill region 416 is between the interior infill region 414 and the outside contour region 418. The build part 402 is also partitioned along the height. For example, as described above with reference to FIGS. 4-6, different heights along the same surface of a build part define different angles of incidence with respect to the beam emitter 106, such that a first location may be classified as an inskin and a second location along the height of the same surface may be classified as an outskin. The build part 402 illustrated in FIG. 8 is partitioned into a grid of segments 408 that includes four stacked layers of the five regions 410, 412, 414, 416, 418, resulting in twenty illustrated segments 408. The partitioning of the build part 402 into the segments 408 may be performed by the processors 118 based on programmed guidelines and constraints. At least some of the segments 408 may have different sizes and shapes from other segments 408.

After partitioning, the processors 118 calculate the geometrical characteristics for each of the segments 408. For example, the processors 118 calculate the angle of incidence 420 relative to the beam emitter 106 for each of the segments 408. FIG. 8 shows that the angle of incidence 420 for a first segment 408A, which represents the inside contour region 410 at the top layer, is acute. The angle of incidence 420 for another segment 408B, which represents the inside contour region 410 at the bottom layer, is also acute. Therefore, both the segments 408A, 408B are classified as inskins, although the angle of incidence 420 of the segment 408B is greater than the segment 408A. The angles of incidence 420 for third and fourth segments 408C, 408D, representing the outside contour region 418 at the top and bottom layers, respectively, are obtuse, such that the segments 408C, 408D are classified as outskins. The angle of incidence 420 of the segment 408C is greater than the segment 408D. Although four angles of incidence 420 are illustrated, the processors 118 can determine the angle of incidence for each of the segments 408 (e.g., all twenty segments shown in FIG. 8). The processors 118 may also determine other geometrical characteristics of the different segments at the candidate position, such as the tilt angle relative to horizontal. In the illustrated embodiment, all segments 408 have the same tilt angle relative to horizontal.

The determined one or more geometrical characteristics of the various segments 408 of the build part 402 are used by the processors 118 to select the beam parameters to be used for forming each of the segments 408 during the build process with the goal of providing improved overall quality of the build part 402 relative to using one or more sets of beam parameters without consideration of the effects of geometrical characteristics, such as angle of incidence, on the resulting quality.

In the illustrated embodiment, the third segment 408C is at risk for poor surface quality along the outside surface 406 due to the obtuse angle of incidence 420 indicating that the surface 406 is an outskin surface. The processors 118 can select or determine a corresponding set of beam parameters for the segment 408C to mitigate the accumulation of melt extensions and other non-uniformities along the outside surface 406. The selected set of beam parameters may include power, scan speed, beam diameter, and/or offset settings in an effort to control the amount of energy that is absorbed by the surrounding powder bed below the outside surface 406. In a first non-limiting example, the power and the scan speed may both be increased (relative to a baseline set of beam parameters) in order to quickly impart a sufficient amount of energy into the desired portion of the layer or stratum of source material to fuse the desired source material onto the build part 402 while controlling the amount of energy that dissipates beyond the build part 402 into the powder bed. For example, the beam diameter may be increased from of 100 μm for the baseline set of beam parameters to 200 μm in order to adjust the aspect ratio of the meltpool on the segment 408C for more accurate and precise control of the meltpool and the resulting deposited material. In addition, the offsets may be changed relative to the baseline set of beam parameters to account for the weld penetration, which may otherwise result in deposited material outside the defined part geometry. Modifying the beam parameters for different segments 408 based on the angle of incidence can enable improved surface quality along the outside surface 406, sub-surface porosity, and dimensional accuracy without having a significant effect on build times, energy consumption, and/or the like. The improved surface quality of the outside surface 406 can eliminate or alleviate post-build finishing tasks and/or enable the additive construction of parts with finer features and/or previously inaccessible geometry.

The angle of incidence 420 of the first segment 408A along the inside surface 404 is less than the angle of incidence 420 of the third segment 408C. The acute angle of incidence 420 of the first segment 408A indicates that the first segment 408A is classified as an inskin. The consolidated mass of the build part 402 below the segment 408A can absorb and dissipate excess energy from the focused beams. Because the resulting surface quality of the inside surface 404 is less impacted by meltpool over-penetration, the set of beam parameters assigned to the first segment 408A can be selected to enhance other goals or considerations, such as reduce the overall build time, optimize for density, optimize geometric fidelity, or the like. In a non-limiting example, the set of beam parameters selected for forming the segment 408A may have a power that is selected to provide appropriate energy for fusing the source material to form fully dense material. As an example a laser power of 350 W and scan speed of 1200 mm/s may be appropriate for forming the segment 408A, however the power for forming the third segment 408C on the opposite side of the part 402 may be reduced to 315 W at 1200 mm/s, or maintain a power of 350 W with an increase in scan speed to 1333 mm/s to produce a segment with improved surface quality and/or geometric accuracy. The scan speed in the set of beam parameters assigned to the segment 408A can be the same, faster, or slower than the scan speed in the set assigned to the segment 408C. In a non-limiting example, the beam diameter in the set assigned to the segment 408A may be larger than the beam diameter in the set assigned to the segment 408C. In another example, the offset in the set assigned to the segment 408A may be smaller than the offset in the set assigned to the segment 408C.

The second segment 408B is classified as an inskin, similar to the first segment 408A, based on the acute angle of incidence 420 relative to the beam emitter 106. Based on the inskin classification and the location along the same inside contour region 410, the processors 118 may assign the same or similar beam parameters to the second segment 408B as the beam parameters assigned to the first segment 408A. Optionally, at least some of the beam parameters assigned to the second segment 408B may differ from the beam parameters assigned to the first segment 408A due to the larger angle of incidence 420 of the second segment 408B relative to the first segment 408A.

The fourth segment 408D is classified as an outskin, similar to the third segment 408C, based on the obtuse angle of incidence 420. The processors 118 may assign the same or similar beam parameters to the fourth segment 408D as the beam parameters assigned to the third segment 408C based on the outskin classification and the location along the same outside contour region 418. Optionally, at least some of the beam parameters assigned to the fourth segment 408D may differ from the beam parameters assigned to the third segment 408C due to the smaller angle of incidence 420 of the fourth segment 408D relative to the third segment 408C.

The processors 118 may assign beam parameters to each of the segments 408, including the infill segments 408 interior of the contour regions 410, 418. For example, a fifth segment 408E is located at the top layer along the outside infill region 416 adjacent to the third segment 408C. The processors 118 can assign different beam parameters to segments 408 in different regions (e.g., infill, contour, etc.) along the thickness. For example, the segments 408 along the infill regions 412, 414, and 416 may be assigned different parameters than the segments 408 along the contour regions 410, 418. The beam parameters assigned to the fifth segment 408E are based at least in part on the characteristics of the desired infill bulk structure. As described above, the beam parameters assigned to the segments 408 along the infill regions 412, 414, 416 are also based on one or more geometrical characteristics of the segments 408, such as the angle of incidence relative to the beam emitter 106. In the illustrated embodiment, the offset beam parameter assigned to the fifth segment 408E adjacent the outskin surface segment 408C may be different than the offset assigned to a sixth segment 408F located at the same layer (e.g., height) along the inside infill region 416. The sixth segment 408F is adjacent the inskin surface segment 408A. For example, the offset assigned to the fifth segment 408E may be greater than the offset assigned to the sixth segment 408F in order to maintain proportions and relationships between the segments 408 at the interfaces between the segments 408.

After selecting the respective beam parameters for the different segments 408 of the build part 402, the processors 118 can control the AM instrument 101 to additively manufacture the build part 402. For example, the processors 118 may generate, or at least update, the build plan 132 to incorporate the designated sets of beam parameters associated with the different segments 408. The build plan 132 designates operations to be performed by the AM instrument 101 to form the build part 402. The build plan 132 may provide the scan paths for the beam emitter 106 (e.g., the scanning head thereof) to aim focused energy beams. The processors 118 may control the components of the AM instrument 101 according to the build plan 132 to produce the build part 402. The processors 118 may generate control signals that are communicated to the different components (e.g., the beam emitter 106, the applicator device 117, and the like) to control the AM instrument 101.

Figure 9:
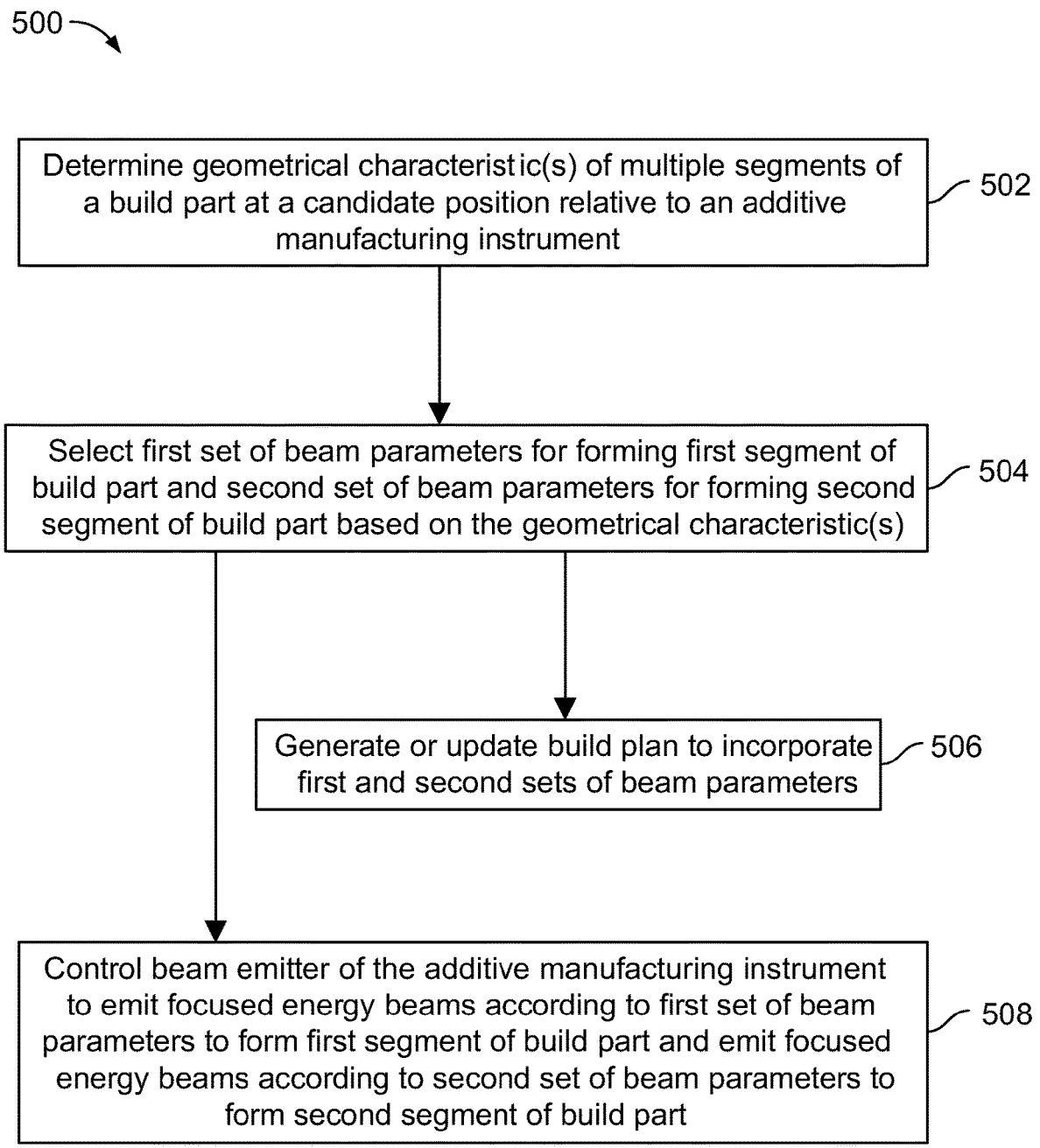
FIG. 9 is a flow chart of a method for additive manufacturing using different beam parameters to form different segments of a build part for improving the quality of the build part according to an embodiment.

FIG. 9 is a flow chart of a method 500 for additive manufacturing using different beam parameters to form different segments of a build part for improving the surface quality of the build part according to an embodiment. The method 500 may be performed in whole, or at least in part, by the one or more processors 118 of the control unit 108 of the AM system 100 shown in FIG. 1. Optionally, some operator input can be provided in one or more of the steps. Optionally, the method 500 may include more steps than shown in FIG. 9, fewer steps than shown in FIG. 9, different steps that are not shown in FIG. 9, and/or a different arrangement or order of the steps than shown in FIG. 9.

The method 500 begins at 502, at which one or more geometrical characteristics of each of multiple segments of a build part are determined at a candidate position of the build part relative to an additive manufacturing instrument. The one or more geometrical characteristics include an angle of incidence between a beam line extending from an electromagnetic energy source of the additive manufacturing instrument and a surface normal of a respective skin of the corresponding segment proximate to the beam line. Optionally, the one or more geometrical characteristics may also include an angle of the respective skin of the corresponding segment relative to an upper surface of a platform of the additive manufacturing instrument.

At 504, a first set of beam parameters is selected for forming a first segment of the segments of the build part and a second set of beam parameters is selected for forming a second segment of the segments of the build part. The first and second sets of beam parameters are selected based on the one or more geometrical characteristics of the segments that are determined in step 502. At least one of the beam parameters in the second set differs from the beam parameters in the first set. Optionally, the beam parameters include power, beam size, scan speed, and/or offset. The first and second sets of beam parameters may be selected, at least in part, by comparing the respective angle of incidence of each of the first and second segments relative to the beam emitter to at least one designated threshold angle. For example, responsive to determining that the angle of incidence of the second segment is greater than the angle of incidence of the first segment, the first and second sets of beam parameters may be selected such that the second set has a greater offset beam parameter than the first set.

At 506, a build plan is generated or updated to incorporate the first and second sets of beam parameters. The build plan provides instructions to the additive manufacturing instrument for additively manufacturing the build part. Optionally, instead of or in addition to generating or updating the build plan, the flow may proceed directly from 504 to 508. At 508, a beam emitter of the additive manufacturing instrument is controlled during a build process to emit focused energy beams according to the first set of beam parameters to form the first segment of the build part and to emit focused energy beams according to the second set of beam parameters to form the second segment of the build part.

While various spatial and directional terms, such as top, bottom, lower, mid, lateral, horizontal, vertical, front and the like are used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

The diagrams of embodiments herein illustrate one or more control or processing units, such as the control unit 108 shown in FIG. 1. It is to be understood that the control or processing units represent circuits, circuitry, or portions thereof that are implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. The hardware can include electronic circuits that include and/or are connected to one or more logic-based devices, such as microprocessors, processors, controllers, or the like. Optionally, the control unit 108, or the one or more processors 118 thereof, represents processing circuitry such as one or more of a field programmable gate array (FPGA), application specific integrated circuit (ASIC), microprocessor(s), a quantum computing device, and/or the like. The circuits in various embodiments are configured to execute one or more algorithms to perform functions described herein. The one or more algorithms include aspects of embodiments disclosed herein, whether or not expressly identified in a flowchart or a method.

As used herein, the term "control unit," or the like includes any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only and are thus not intended to limit in any way the definition and/or meaning of such terms. The control unit 108 shown in FIG. 1 is configured to execute a set of instructions that are stored in one or more storage elements (such as one or more memories), in order to process data. The set of instructions includes various commands that instruct the control unit 108 (e.g., the processor(s) 118 thereof) as a processing machine to perform specific operations such as the methods and processes of the various embodiments of the subject matter described herein. In an embodiment, the set of instructions is in the form of a software program. The processing of input data by the processing machine is in response to user commands, in response to results of previous processing, or in response to a request made by another processing machine. As used herein, the term "software" includes any computer program stored in memory for execution by a computer, including but not limited to RAM memory, ROM memory, EPROM memory, EEPROM memory, and non-volatile RAM (NVRAM) memory.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An additive manufacturing system comprising:
a beam emitter; and a control unit comprising one or more processors and a memory, the one or more processors configured to determine one or more geometrical characteristics of each of multiple segments of a build part at a candidate position of the build part relative to a build platform of an additive manufacturing instrument, wherein the one or more geometrical characteristics include an angle of incidence between (i) a beam line extending from the beam emitter of the additive manufacturing instrument to a surface layer of the build part and (ii) a surface normal vector of a respective skin of the corresponding segment proximate to the beam line, wherein the skin of the corresponding segment is a side surface of one or more layers of the build part immediately below the surface layer,
wherein the one or more processors are configured to select, based on the one or more geometrical characteristics of the segments including the angle of incidence, a first set of beam parameters to be used by the beam emitter to emit first focused energy beams that form a first segment of the segments of the build part and a second set of beam parameters to be used by the beam emitter to emit second focused energy beams that form a second segment of the segments of the build part, wherein at least one of the beam parameters in the second set differs from the beam parameters in the first set.

2. The additive manufacturing system of claim 1, wherein the beam parameters include one or more of power, beam size, scan speed, or offset.

3. The additive manufacturing system of claim 1, wherein the one or more processors select the first set of beam parameters by comparing the angle of incidence of the first segment to a designated threshold angle and select the second set of beam parameters by comparing the angle of incidence of the second segment to the designated threshold angle.

4. The additive manufacturing system of claim 3, wherein the designated threshold angle is between 80 degrees and 100 degrees.

5. The additive manufacturing system of claim 3, wherein the designated threshold angle is 90 degrees.

6. The additive manufacturing system of claim 1, wherein, responsive to determining that the angle of incidence of the second segment is greater than the angle of incidence of the first segment, the one or more processors assign the first and second sets of beam parameters such that the second set associated with the second segment has a greater offset beam parameter than the first set associated with the first segment.

7. The additive manufacturing system of claim 1, wherein the one or more processors assign the first and second sets of beam parameters based on the first and second segments being disposed along different surfaces of the build part.

8. The additive manufacturing system of claim 1, wherein the one or more processors assign the first and second sets of beam parameters based on the first and second segments being disposed along a common surface of the build part at different respective heights relative to the build platform of the additive manufacturing instrument.

9. The additive manufacturing system of claim 1, wherein the one or more processors assign the first and second sets of beam parameters based on the first and second segments being disposed along a common layer of the build part at different respective locations.

10. The additive manufacturing system of claim 1, wherein the one or more processors are configured to input the one or more geometrical characteristics of the first segment, including the angle of incidence, into a function that calculates one or more corresponding values for the first set of beam parameters based on the one or more geometrical characteristics of the first segment.

11. The additive manufacturing system of claim 1, wherein the one or more processors are configured to generate or update a build plan for controlling the additive manufacturing instrument to additively manufacture the build part at the candidate position based on the first and second sets of beam parameters that are assigned.

12. The additive manufacturing system of claim 1, wherein, responsive to receiving an indication to initiate a build process with the build part at the candidate position, the one or more processors are configured to control the beam emitter of the additive manufacturing instrument to emit the first focused energy beams according to the first set of beam parameters to form the first segment of the build part and to emit the second focused energy beams according to the second set of beam parameters to form the second segment of the build part.

13. The additive manufacturing system of claim 1, wherein the one or more processors are configured to determine that the angle of incidence of the first segment is within a first designated range and the angle of incidence of the second segment is within a second designated range that is discrete from the first designated range, wherein the first set of beam parameters is associated with the first designated range and the second set of beam parameters is associated with the second designated range.

14. A method comprising:
determining one or more geometrical characteristics of each of multiple segments of a build part at a candidate position of the build part relative to a build platform of an additive manufacturing instrument, wherein the one or more geometrical characteristics include an angle of incidence between (i) a beam line extending from a beam emitter of the additive manufacturing instrument to a surface layer of the build part and (ii) a surface normal vector of a respective skin of the corresponding segment proximate to the beam line, wherein the skin of the corresponding segment is a side surface of one or more layers of the build part immediately below the surface layer; and
selecting, based on the one or more geometrical characteristics of the segments including the angle of incidence, a first set of beam parameters to be used by the beam emitter to emit first focused energy beams that form a first segment of the segments of the build part and a second set of beam parameters to be used by the beam emitter to emit second focused energy beams that form a second segment of the segments of the build part, wherein at least one of the beam parameters in the second set differs from the beam parameters in the first set.

15. The method of claim 14, further comprising controlling the beam emitter of the additive manufacturing instrument to emit the first focused energy beams according to the first set of beam parameters to form the first segment of the build part and to emit the second focused energy beams according to the second set of beam parameters to form the second segment of the build part.

16. The method of claim 14, wherein the beam parameters include one or more of power, beam size, scan speed, or offset.

17. The method of claim 14, wherein the first and second sets of beam parameters are selected by comparing the angle of incidence of each of the first and second segments to a designated threshold angle.

18. The method of claim 14, wherein, responsive to determining that the angle of incidence of the second segment is greater than the angle of incidence of the first segment, the first and second sets of beam parameters are selected such that the second set associated with the second segment has a greater offset beam parameter than the first set associated with the first segment.

19. The method of claim 14, further comprising generating or updating a build plan to incorporate the first and second sets of beam parameters.

20. An additive manufacturing system comprising:
a beam emitter; and a control unit comprising one or more processors and a memory, the one or more processors configured to determine an angle of incidence of each of multiple segments of a build part at a candidate position of the build part relative to a platform on which the build part is to be build, the angle of incidence of each of the segments defined between (i) a beam line extending from the beam emitter of an additive manufacturing instrument to a surface layer of the build part and (ii) a surface normal vector of a respective skin of the corresponding segment proximate to the beam line, wherein the skin of the corresponding segment is a side surface of one or more layers of the build part immediately below the surface layer,
wherein the one or more processors are configured to select, based on the angles of incidence of the segments, a first set of beam parameters to be used by the beam emitter to emit first focused energy beams that form a first segment of the segments of the build part and a second set of beam parameters to be used by the beam emitter to emit second focused energy beams that form a second segment of the segments of the build part, the second set of beam parameters including a greater offset beam parameter than the first set based on the angle of incidence of the second segment being greater than the angle of incidence of the first segment.

21. The additive manufacturing system of claim 20, wherein, responsive to receiving an indication to initiate a build process with the build part at the candidate position, the one or more processors are configured to control the beam emitter of the additive manufacturing instrument to emit the first focused energy beams according to the first set of beam parameters to form the first segment of the build part and to emit the second focused energy beams according to the second set of beam parameters to form the second segment of the build part.

* * * * *